US007223429B2

(12) United States Patent
Berger et al.

(10) Patent No.: US 7,223,429 B2
(45) Date of Patent: May 29, 2007

(54) METHOD AND APPARATUS FOR MAKING LOAVES CRUSTLESS, SLICED BREAD

(75) Inventors: Richard A. Berger, Ellisville, MO (US); Clifton M. Buell, Ellisville, MO (US); Kevin Ike Wilson, Brookston, TX (US); R. Daniel Hickman, Powdery, TX (US); Jose Maria Aguila Plassa, Barcelona (ES); Javier Llavina Nadal, Barcelona (ES); Barry Janeway, Paris, TX (US)

(73) Assignee: Sara Lee Bakery Group, Inc., Downers Grove, IL (US)

( * ) Notice: Subject to any disclaimer, the term of this patent is extended or adjusted under 35 U.S.C. 154(b) by 284 days.

(21) Appl. No.: 10/364,657

(22) Filed: Feb. 11, 2003

(65) Prior Publication Data

US 2004/0156966 A1 Aug. 12, 2004

(51) Int. Cl.
*A21D 13/00* (2006.01)
*A23L 1/10* (2006.01)

(52) U.S. Cl. ....................... 426/410; 426/479; 426/503

(58) Field of Classification Search ................ 426/518, 426/478, 479, 482, 496, 410, 524, 503; 198/384, 198/394, 397, 399, 400
See application file for complete search history.

(56) References Cited

U.S. PATENT DOCUMENTS 1,493,326 A * 5/1924 Duke .......................... 83/856
2,669,377 A * 2/1954 Van Poolen et al. ............ 53/70
3,406,730 A * 10/1968 Mantelet ...................... 83/647
4,195,098 A * 3/1980 Otto ........................... 426/513
4,512,137 A * 4/1985 Koberlein .................... 53/435

FOREIGN PATENT DOCUMENTS

DE 28 44 446 A1 4/1980
GB 2 338 168 A 12/1999

OTHER PUBLICATIONS http://web.archive.org/web/20021019181238/http://www.baking911recipes.com/bread_pullmanloaf.htm Oct. 2002.*
Examination Report issued Aug. 10, 2005 in Portuguese Patent Application No. 2004071197.

* cited by examiner

*Primary Examiner*—Arthur L. Corbin
(74) *Attorney, Agent, or Firm*—Harness, Dickey & Pierce, P.L.C.

(57) ABSTRACT

A method of making a loaf of crustless, sliced bread from a rectangular prismatic loaf of bread, the method comprising: decrusting the bread by moving the loaf of broad longitudinally past cutting blades to remove the crust from four sides of the loaf of bread; slicing the crustless bread by moving the loaf transversely past a plurality of blades to slice the loaf; and packaging the loaf by moving the loaf longitudinally to a packaging station.

36 Claims, 12 Drawing Sheets

METHOD AND APPARATUS FOR MAKING LOAVES CRUSTLESS, SLICED BREAD

BACKGROUND OF THE INVENTION

This invention relates to methods and apparatus for making bread, and in particular to methods and apparatus for making loaves of crustless, sliced bread.

Many people do not like the appearance or flavor of the crust that forms on bread as it bakes. Thus, the crust is often trimmed from the individual slices of bread when making sandwiches, French toast, or canapés etc. While the production of bread in a modem bakery is highly efficient, the production of a loaf of crustless, sliced bread presents a number of technical difficulties. The crust is important to the integrity of the loaf, and after the crust is removed, the loaf is more difficult to handle and process. Similarly, once after the bread is sliced, it is difficult to handle and keep aligned for further handling and processing.

SUMMARY OF THE INVENTION

The present invention provides a method and apparatus for making loaves of crustless, sliced bread, overcoming the difficulties in handling loaves after the crust has been removed and/or after the bread has been sliced.

Generally the method of this invention comprises: baking a loaf of bread; cooling the loaf of bread, decrusting the loaf of bread, slicing the loaf of bread, and packaging the loaf of bread.

Generally, the apparatus of the invention comprising apparatus for making dough, apparatus for baking the dough into loaves, apparatus for cooling the loaves, apparatus for decrusting the loaves, apparatus for slicing the loaves, and apparatus for packaging the loaves.

According to one aspect of method and apparatus of this invention, the loaf is conveyed longitudinally as the crust is removed from its sides, then transversely as the loaf is sliced, and longitudinally as the loaf is packaged.

The method and system of this invention allow for the fast and efficient production of loaves of crustless, sliced bread, and in particular for the automation of the production of crustless, sliced bread. These and other features and advantages will be in part apparent and in part pointed out herein after.

DETAILED DESCRIPTION OF THE INVENTION

Figure 1:
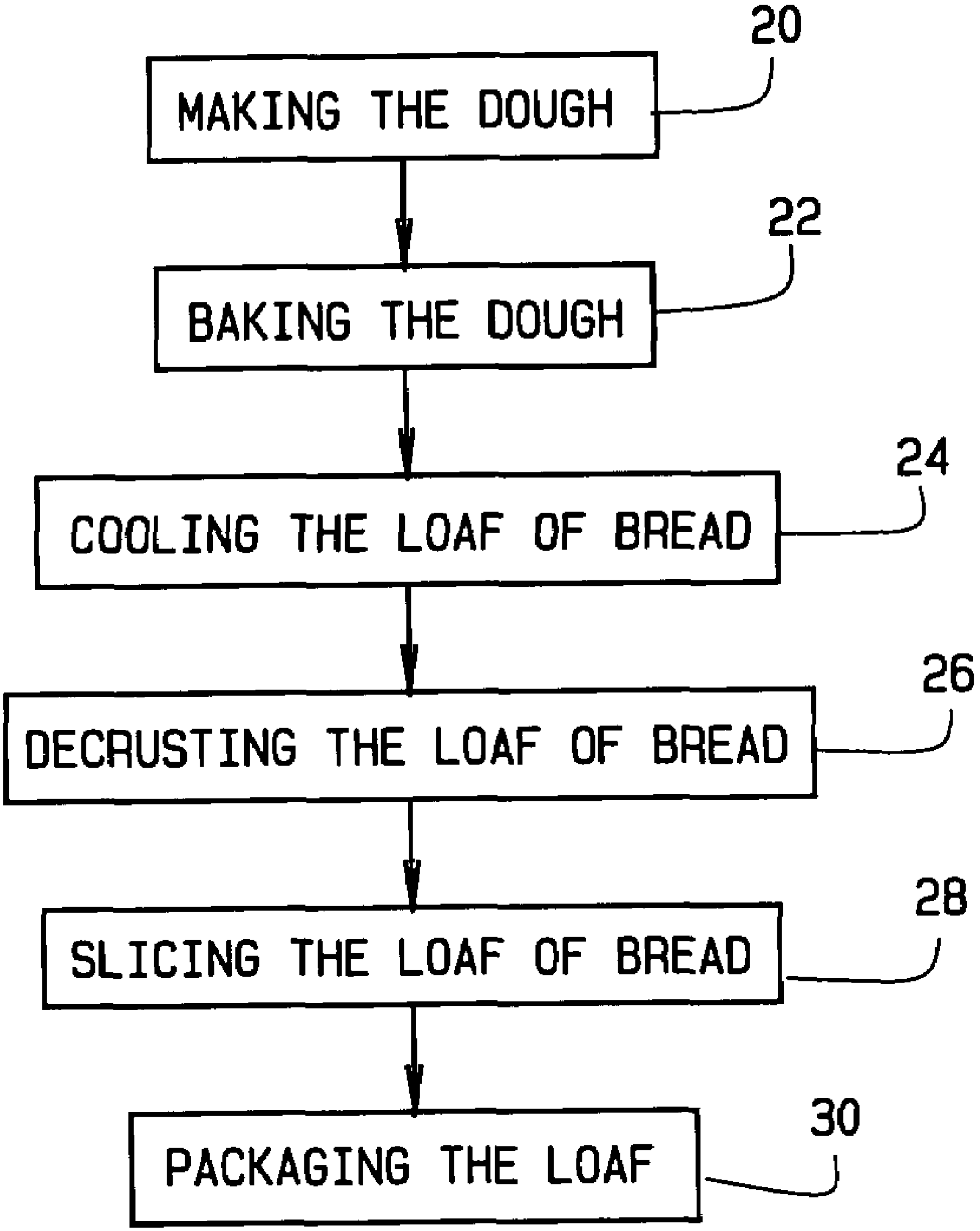
FIG. 1 is a block diagram of the preferred embodiment of a method of making crustless, sliced bread in accordance with the principles of this invention.

A preferred embodiment of the method of making crustless, sliced bread of this invention is shown schematically in the block diagram of FIG. 1. As shown in FIG. 1, in this preferred embodiment, the method comprises at step 20, making dough; at step 22, baking the dough; at step 24, cooling the loaves of bread; at 26 decrusting the loaves of bread, at step 28, slicing the loaves of bread; and at step 30, packaging the loaves of bread. These steps are shown in greater detail in the flow charts of FIGS. 5–10.

Figure 2:
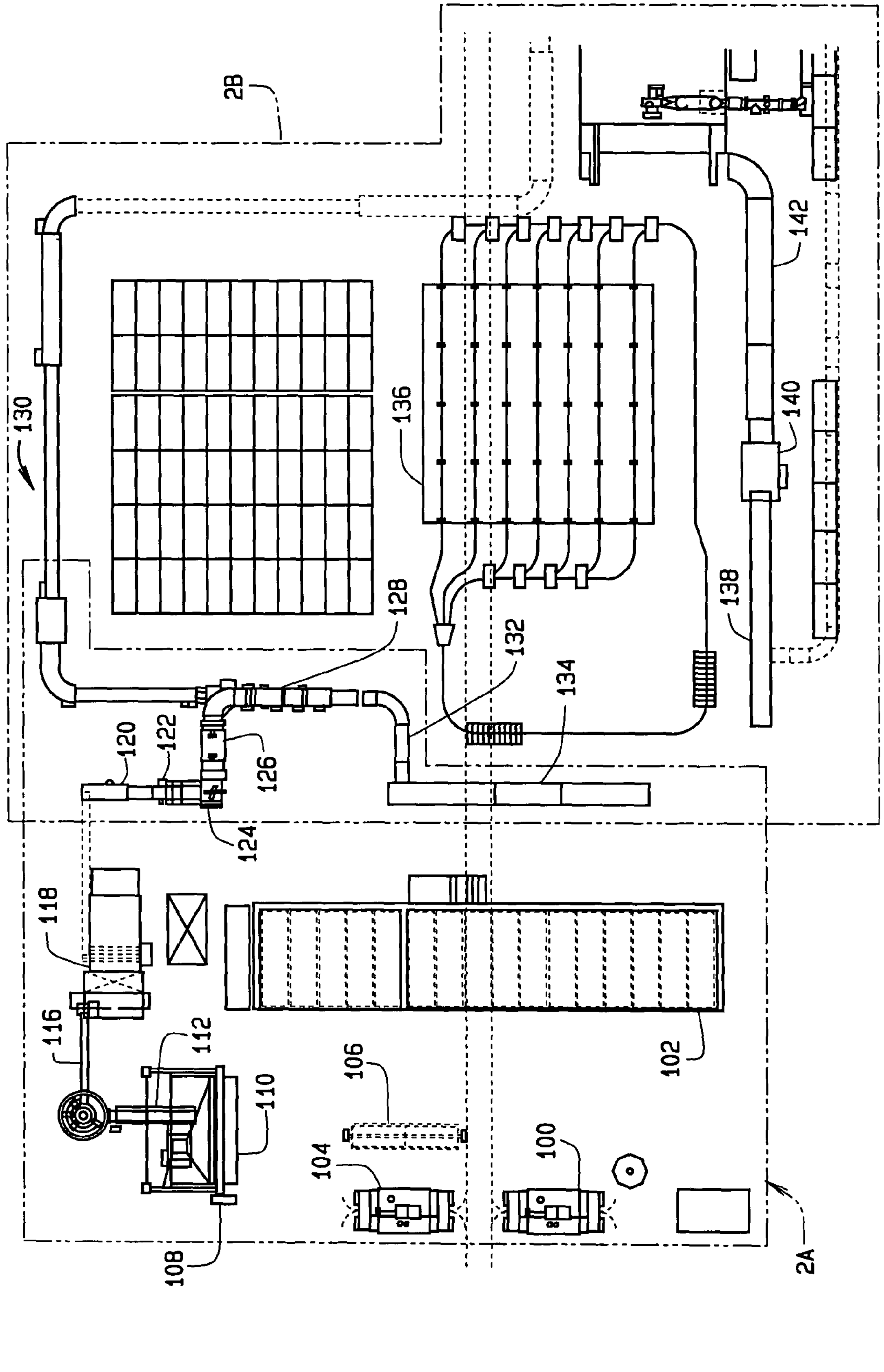
FIG. 2 is a top plan view of one embodiment of a first portion of an apparatus according to the principles of this invention, for carrying out the method of this invention.
Figure 2A:
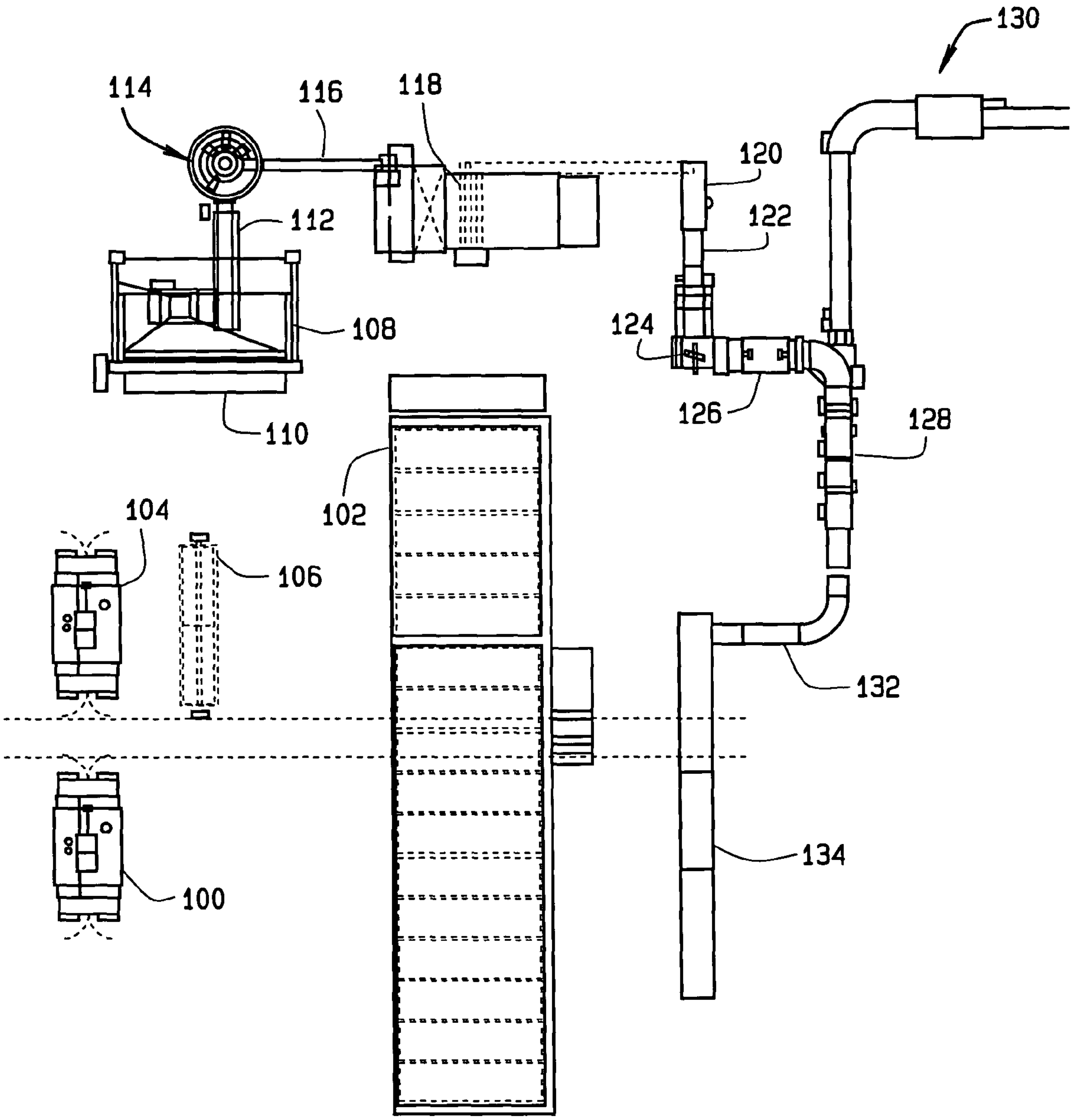
FIG. 2A is an enlarged top plan view of a part of the first portion of the apparatus shown in FIG. 2 indicated as 2A in FIG. 2.
Figure 3:
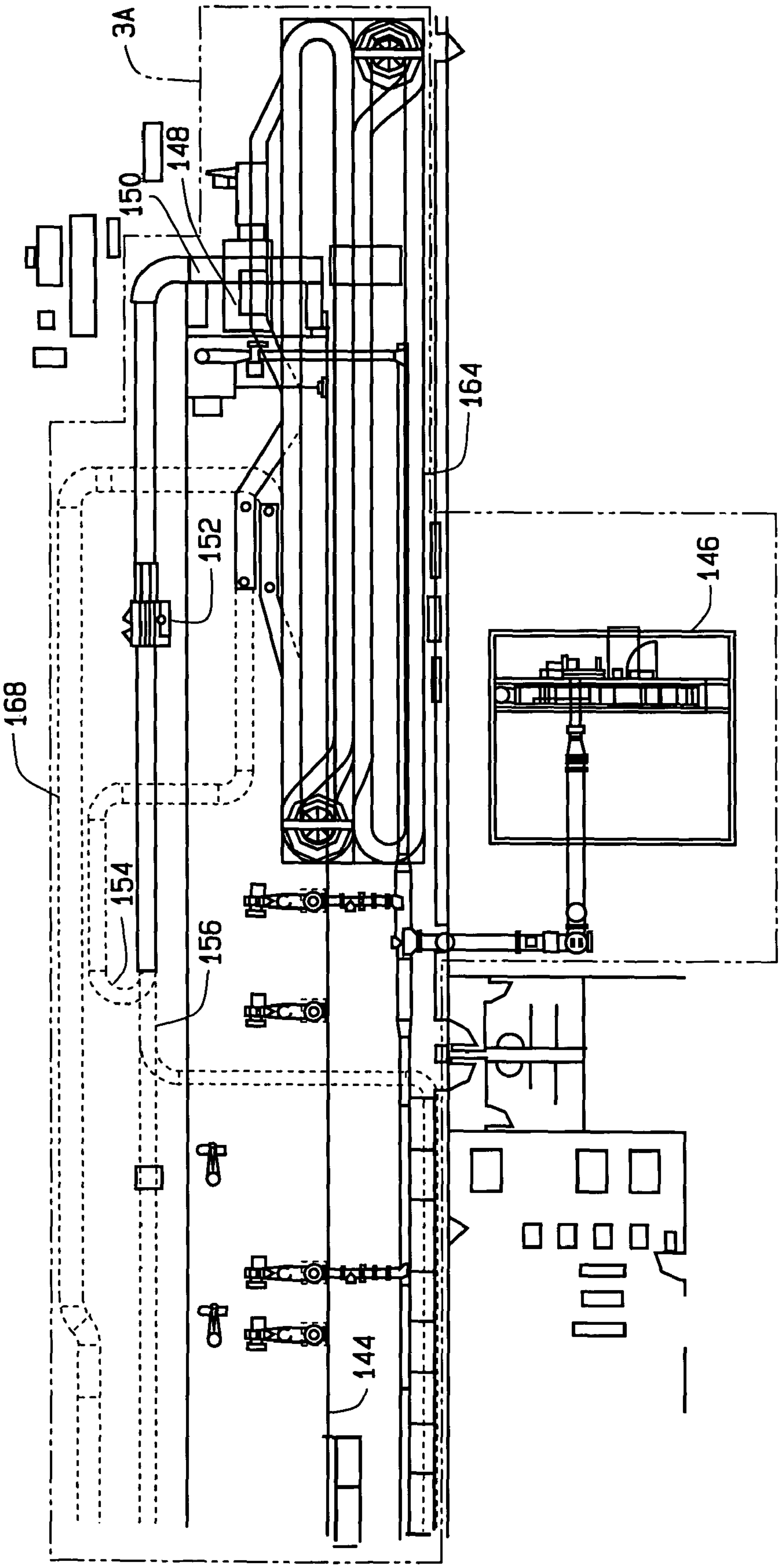
FIG. 3 is a top plan view of one embodiment of a second portion of an apparatus according to the principles of this invention, for carrying out the method of this invention.
Figure 4:
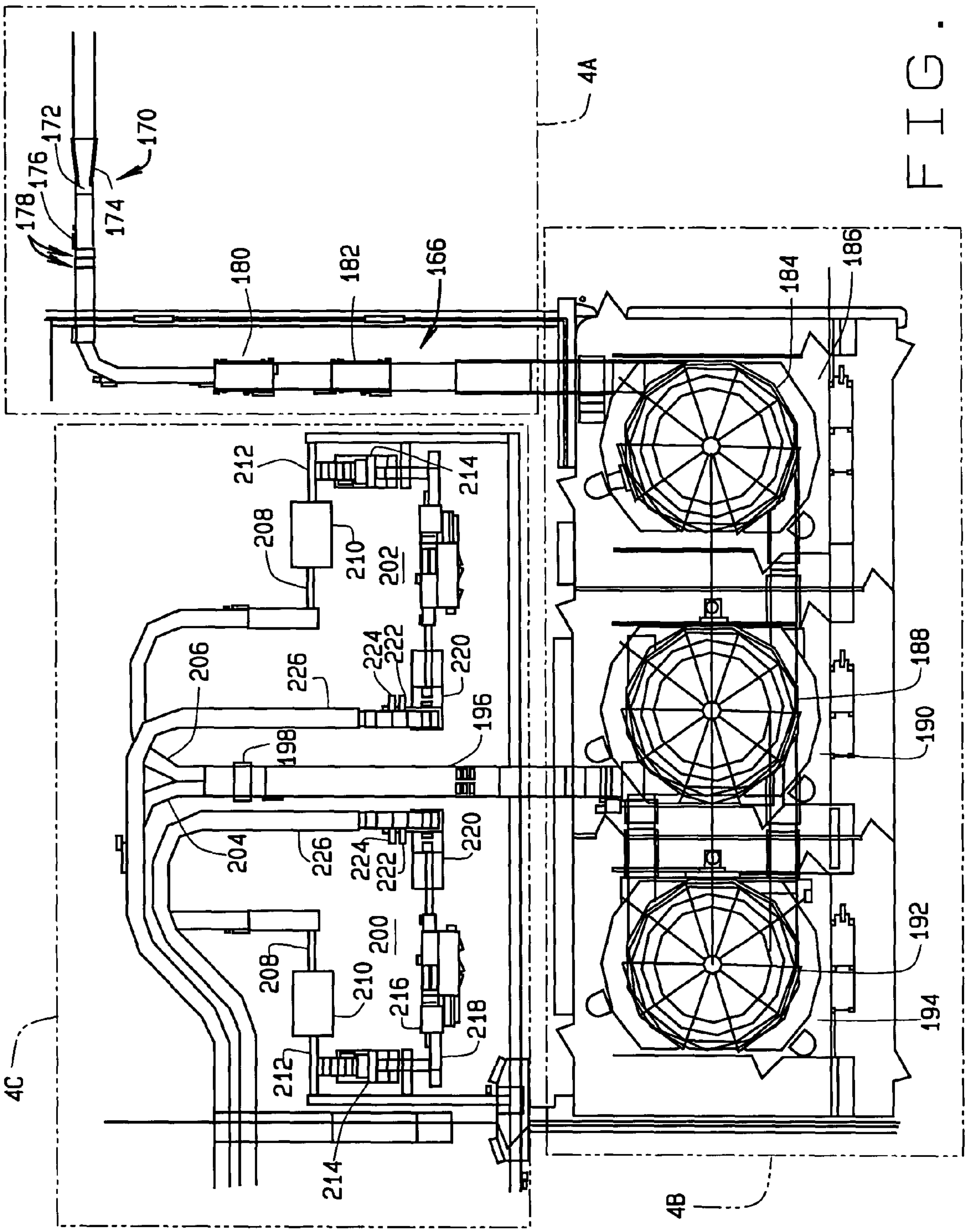
FIG. 4 is a top plan view of one embodiment of a third portion of an apparatus according to the principles of this invention, for carrying out the method of this invention.

One embodiment of an apparatus for carrying out the method of this invention is shown in FIGS. 2, 3 and 4. As shown in FIG. 2, and in particular FIG. 2A, the apparatus includes equipment for making dough. In this first preferred embodiment the dough is preferably a sponge dough, although the dough can be made by some other process. Thus, the apparatus comprises a tilt bowl mixer 100 into which the main ingredients of the sponge are added through a mechanized bulk addition system, and the minor ingredients are added by hand. The tilt mixer 100 preferably has a refrigerated jacket to control batch temperature as needed, and a capacity of at least about 2000 pounds. An example of a suitable tilt bowl mixer 100 is the Model 20 tilt bowl mixer, available from Peerless Manufacturing Company At the completion of the mix cycle, the sponge is dumped into a trough and moved to a special conditioning cabinet 102 for development. The sponge dough is allowed to development in the conditioner cabinet for a specified time (typically about 240 minutes), and then removed and added to a final mixer 104. The sponge dough trough is lifted and dumped into the final mixer 104 by an elevator device 106. The final mixer 104 is preferably a tilt bowl mixer with a refrigerated jacket to control batch temperature, and has a capacity of at least about 3000 pounds. An example of a suitable tilt bowl mixer 104 is the Model 30 tilt bowl mixer, available from Peerless Manufacturing Company.

Main ingredients are added to the sponge dough in the final mixer 104 through a bulk weigh system, and the minor ingredients are added by hand. After the proper mix cycle is completed, the dough is dumped into a stainless steel trough and held for a specified time (typically about 5 to 15 minutes) for development before further processing.

The properly developed final dough is dumped into the hopper of an extrusion bread divider 108 by a trough elevator 110. An example of a suitable extrusion bread divider 108 is the single knife extrusion bread divider, available from AMF Companyor a double knife extrusion divider, available from ADD. The extruded dough is cut into balls of a precise weight and dropped onto take-away conveyor 112. The take-away conveyor 112 is equipped with flour sifters (not shown) to give the dough balls a sprinkling of flour. The dough balls are conveyed to a conical three-quarter rounder 114, where they are further shaped and floured. An example of a suitable conical three-quarter rounder 114 is the Model BP60 conical three-quarter rounder, available from APV. The shaped and floured dough balls exit the rounder 114 and are conveyed by conveyor 116 to a cup style intermediate proofer 118. An example of a suitable intermediate proofer 118 is a seven pocket intermediate proofer, available from AMF.

The dough balls are held in the intermediate proofer 118 for a specified time (typically about 7 minutes) while further development takes place. At the discharge of the intermediate proofer 118, the dough balls are deposited upon a double-eliminator device 120 that rejects any balls that may be sticking together or piled on top of one another. An example of a suitable double-eliminator device 120 is the Do-Spacer double-eliminator device, available from Peerless Manufacturing Company. Then the dough balls are conveyed to a special spacing conveyor 122 to make the exact spacing required as they are deposited into a dual roll sheeter 124. An example of a suitable spacing conveyor 122 is the Do-Spacer spacing conveyor, available from Peerless Manufacturing Company. An example of a suitable dual roll sheeter 124 is the Model SP3 SC SuperKurl dual roll sheeter, available from from Peerless Manufacturing Company.

The dough is sheeted to a specified depth (for example 0.25 inches) and diameter (for example 14 inches) and transferred to a cross grain molding table 126. The dough is rolled into a log of specific diameter (for example 1.75 inches) and length (for example 23 inches) and then turned approximately 45 degrees and deposited on another molding table where it is rolled in a counter direction and then deposited into a baking pan. An example of a cross grain molding table 126 is the TenderKurl cross grain molding table, available from Peerless Manufacturing Company. A device 128 loads the dough into baking pans supplied by a baking pan recirculating system 130.

Figure 2B:
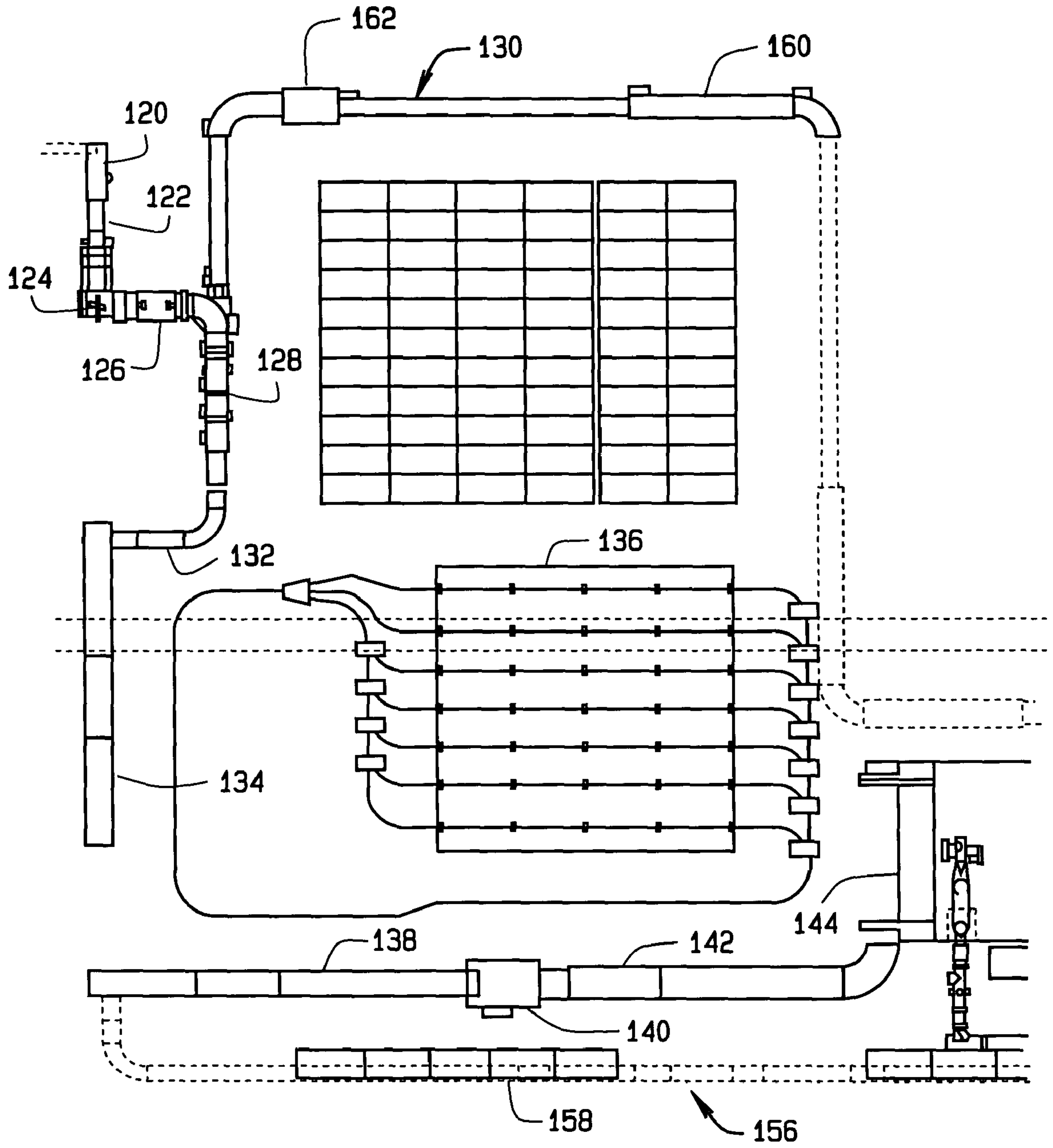
FIG. 2B is an enlarged top plan view of a part of the first portion of the apparatus shown in FIG. 2, indicated as 2B in FIG. 2.

As shown in FIG. 2, and in particular FIG. 2B, a conveyor 132 coveys the baking pans to an area 134 where they are manually loaded onto racks that are manually pushed on rails into a proof box 136. The proof box 136 holds twenty-three racks, and each rack holds forty baking pans. The racks are maintained in the proof box 136 for a very specific time (for example 50–60 minutes) and at a specific temperature (for example 120° F.) and humidity (for example 85%). After the proof time, the rack is removed from the proof box 136 and unloaded onto a conveyor 138 that transports the baking pans to a lidder device 140 that automatically places a lid on the pan.

The lids used in this process are preferably specially weighted to insure that they stay tight to the baking pan during baking. This insures that the loaf will bake squarely, which is important for the subsequent crust removing process. The pans and lids are shaped to bake the bread into rectangular prismatic loaves, with four sides (left, right, top and bottom) and two ends. After the lids are placed on the baking pans, the pans are grouped and transferred via conveyor 142 to baking oven 144.

In this preferred embodiment the oven 144 is a 160 foot baking single-pass chamber, having 25 tube-type natural gas burners that are grouped into 14 zones. An equal number of zones are above the pans as below. Each zone can be set to achieve the desired baking profile. In addition, each burner has lateral heat control. An example of a suitable oven 140 is the Model 235 modified tunnel oven, available from APV, but of course any other suitable oven could be used. The oven preferably also includes a Colorator system as part of the tunnel oven, available from APV, to provide precise circulation inside the oven to assist in achieving the desired baking profile.

Figure 3A:
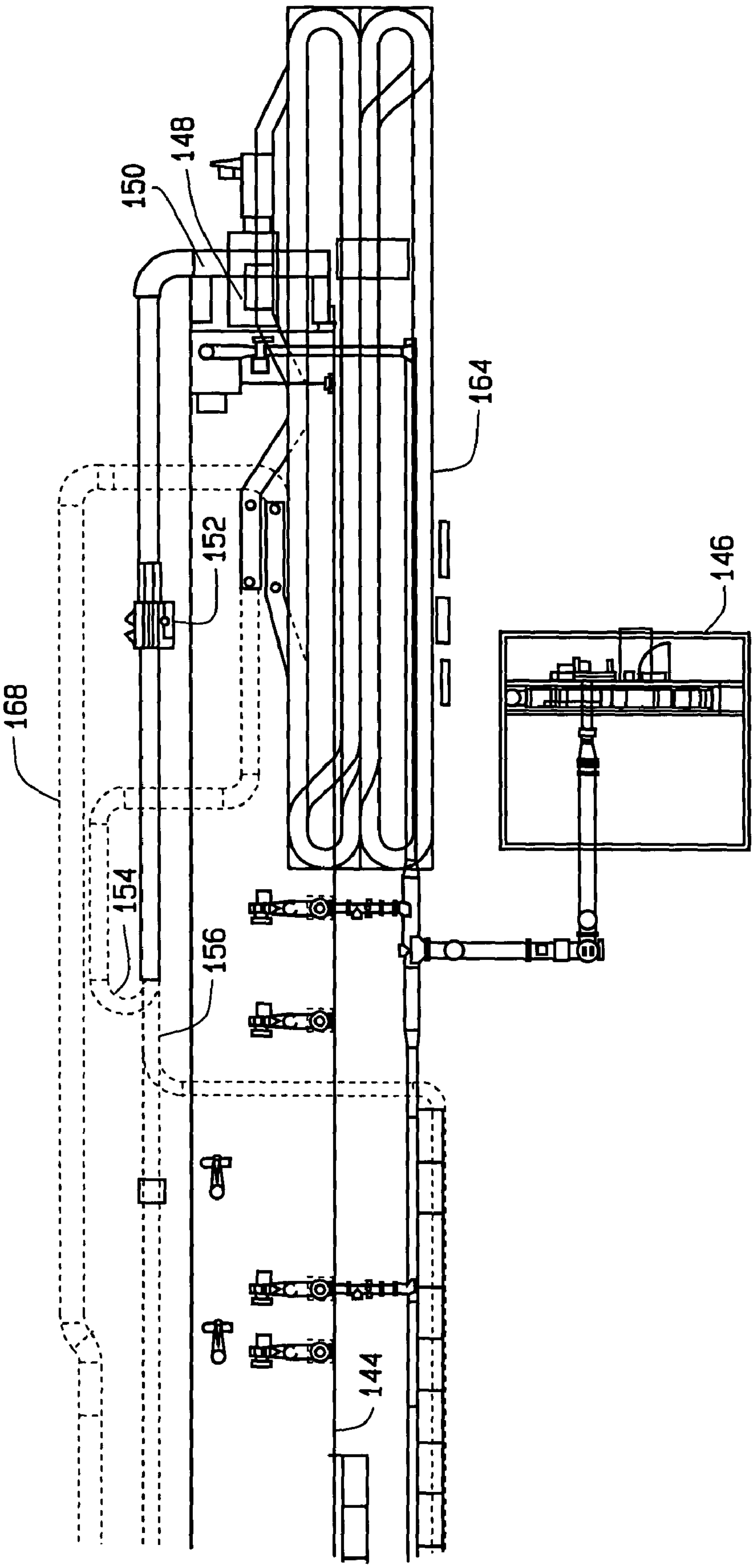
FIG. 3A is an enlarged top plan view of a part of the second portion of the apparatus shown in FIG. 3, indicated as 3A in FIG. 3.

As shown in FIG. 3, and in particular FIG. 3A, the exhaust from oven 144 is conducted through an exhaust stream oxidizer 146 to remove by-products of the baking process. At the discharge end of the baking oven 144, an oven unloader 148 moves each row of baking pans to a discharge conveyor 150.

Immediately out of the oven, the baking pans are conveyed to a device 152 that removes the lids with a magnetized conveyor, and removes the loaves from the baking pans with a vacuum device that gently lifts the bread from the pans and deposits it onto an exit conveyor 154.

The lids, the hot bread and the pans separate on different conveyors. The lids, because of their weight, hold heat. Air from the discharge of the vacuum depanner exhaust blower is ducted to the lid discharge conveyor 156 and used to cool the lids to an acceptable temperature for conveying. The lids are conveyed to a manual load-on/load-off station 158 and on to the automatic lidder 140 (FIGS. 2 and 2B).

The empty baking pans are conveyed to a manual load-on/load-off station 160 (FIGS. 2 and 2B) then on to the molder after passing through a device 162 (FIG. 2 and 2B) that squirts a precise amount of release aid oil into each cavity of the pan. At the discharge of the oven, the bread has an internal temperature of between about 200° F. and about 205° F., and typically about 204° F. The loaves of bread are conveyed to an overhead cooling conveyor 164 for ambient cooling where the internal temperature is reduced from approximately 204° F. degrees to less than about 115° F. degrees, and preferably to an internal temperature of between about 95° F. and about 110 ° F. This ambient cooling is typically between about 45 and about 55 minutes. The loaves of bread have a moisture content of between about 43% and about 45%.

Figure 4A:
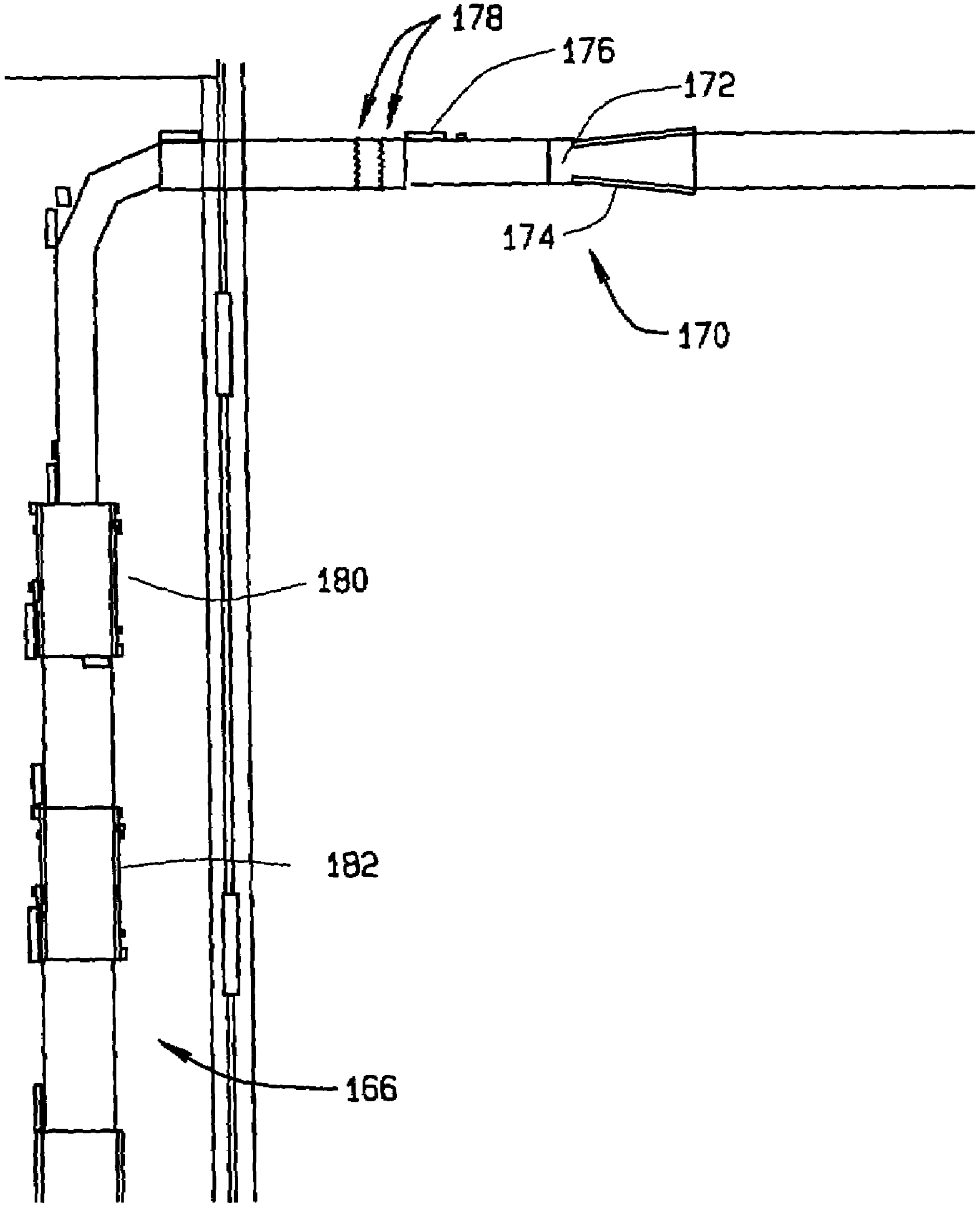
FIG. 4A is an enlarged top plan view of a part of the third portion of the apparatus shown in FIG. 4, indicated as 4A n FIG. 4.

The loaves of bread are conveyed from the process area to the packing area 166 by a conveyor 168. The packing area 166 is atmospherically controlled and specially filtered to reduce the risk of contamination by mold, wild yeast and other undesirable air-borne contaminants. As shown in FIG. 4, and in particular FIG. 4A, the bread enters the packing area via an organizing system 170. The organizing system 170 includes a metering conveyor 172, powered loaf centering guides 174, a bread alignment dead plate 176, and loaf position photo sensors 178. Once inside the packing room, the loaves are further organized with a horizontal slat 1-to-2 diverter 180, where the single lane flow of loaves is split into a dual lane flow. Thereafter, the two lanes of flow of loaves pass through accumulator 182.

The loaves are preferably first subjected to a refrigerated cooling, followed by freezer cooling, as will be discussed in more detail below. The refrigerated cooling preferably takes place at about 40° F., and after refrigerated cooling the loaves have an internal temperature of between about 80° F. and about 90° F., and a moisture content of about 43%. The refrigerated cooling step preferably takes about 40 minutes. The freezer cooling preferably takes place at about 20° F. to about 25° F. (although in the described embodiment for space considerations some of the freezer takes place at a temperature close to, but above, freezing), and after the freezer cooling, the loaves have an internal temperature of between about 35° F. and about 42° F., and more preferably between about 375° F. and about 42° F., and a moisture content of about 43–45%. The freezer cooling step preferably takes about 140 minutes.

Figure 4B:
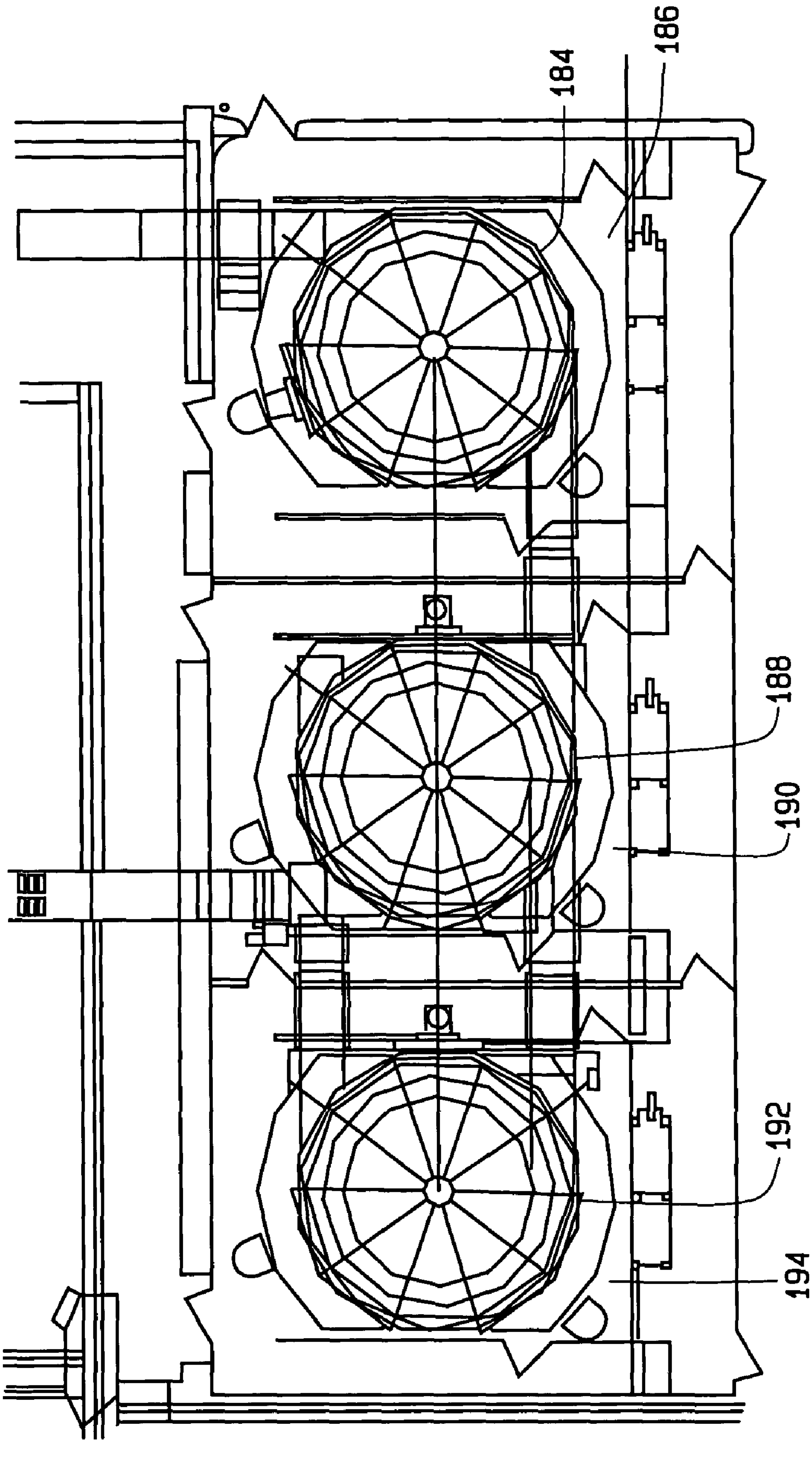
FIG. 4B is an enlarged top plan view of a part of the third portion of the apparatus shown in FIG. 4, indicated as 4B in FIG. 4.

As shown in FIG. 4, and in particular FIG. 4B, the cooling of the loaves can be implemented as follows: the loaves are transferred to a tempered spiral cooler 184 in a separate atmospherically controlled room 186 for further cooling. The loaves of bread rise on the spiral conveyor of cooler 184 to the top of the room 186. The temperature and humidity in the room 186 is controlled (for example a temperature of about 40° F. and humidity of about 83%) to cool the bread to the desired condition (for example an internal temperature of between about 80° F. and about 90° F. (e.g., about 86° F.) and a moisture content of between about 44.1% to about 44.3%). Following the time in the tempered spiral cooler 184 the loaves of bread are transferred to a second spiral cooler 188 in a room 190. The loaves of bread ascend on the spiral conveyor of the spiral cooler 188 to the top of the room 190. The temperature and humidity in the room 190 is controlled (for example a temperature of about 23° F. and humidity of about 84%) to cool the bread to the desired condition (for example a temperature of about 67° F. and a moisture content of about 44.0% to about 44.3%). Following the time in the tempered spiral cooler 188 the loaves of bread are transferred to a third spiral cooler 192 in a room 194. The loaves of bread descend on the spiral conveyor of the spiral cooler 192 to about the bottom of the room 194. The temperature and humidity in the room 194 is controlled (for example a temperature of about 34° F. and humidity of about 73%) to cool the bread to the desired condition (for example a temperature of about 43° F. and a moisture content of about 44.0% to about 44.3%). Following the time in the tempered spiral cooler 192 the loaves of bread are transferred to a fourth spiral cooler 195 in room 190. The fourth spiral 195 shares the same cage as spiral 188. The loaves of bread rise on the spiral conveyor to about the middle of the room 190. The temperature and humidity in the room 190 is controlled as to cool the bread to the desired condition (for example a temperature of about between about 35° F. and about 42° F. (e.g., about 38° F.) and a moisture content of about 40.0% to about 44.3%).

The precise arrangement of the cooling and the cooling equipment can be varied, based upon the space and equipment available.

Figure 4C:
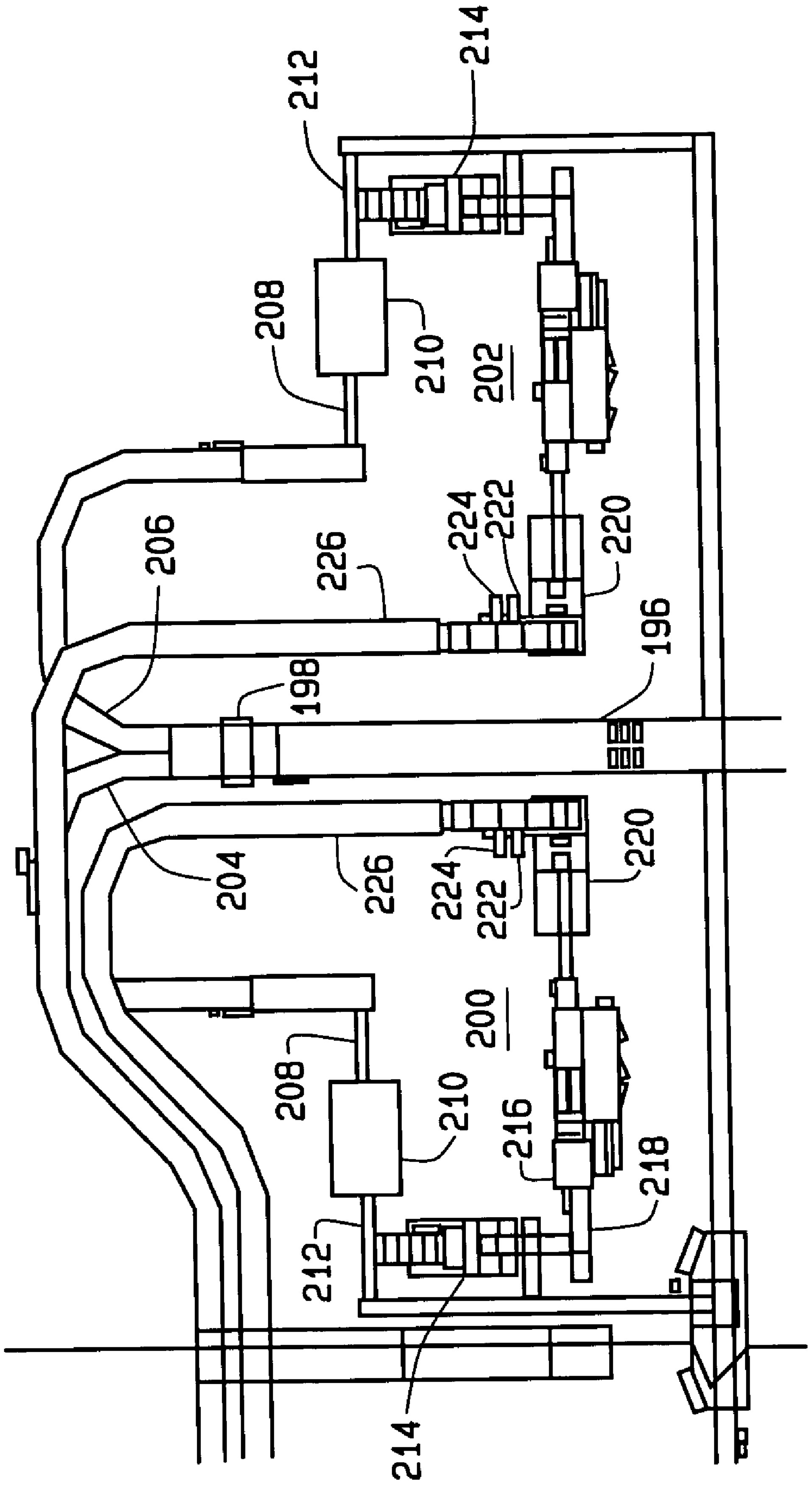
FIG. 4C is an enlarged top plan view of a part of the third portion of the apparatus shown in FIG. 4, indicated as 4C in FIG. 4.

A shown in FIGS. 4 and 4C, the loaves of bread, having achieved the proper temperature and condition, are conveyed on conveyor 196 from the spiral coolers 184, 188, and 192 to a metal detector 198 and then the dual lane flow is split going to two identical packing systems 200 and 202, via conveyors 204, and 206, respectively.

In each of the packing systems 202 and 204, the loaves of bread are transferred from conveyors on which they are being conveyed transversely, to conveyors 208, on which they are fed longitudinally into a decruster 210. Before decrusting, a typical loaf might weigh 37.5 ounces and after decrusting might weigh about 16.0 ounces and about 18.5 ounces. An example of a suitable decruster 210 is the Model 3100 decruster, available from United Bakery Equipment. In the decruster 210, the crust on the left and right sides of the loaf is cut off simultaneously with band-type saw blades. The crust on the top side is then cut off and finally the crust on the bottom side is removed. At the discharge of the decruster 210 the loaves of bread are conveyed by right-angle transfer 212 to the slicer 214.

The loaves of bread with the heels intact are conveyed transversely through a typical band slicer 214. An example of a suitable slicer 214 is the Model 90-75 band slicer, available from United Bakery Equipment. At the discharge of the slicing blades, the heels of the loaf, which still have crust, are split off. The sliced, decrusted loaf is conveyed to the infeed of an inter-wrap machine 216 using a conveyor 218 with a special arrangement of side guides which use forced air and special moving bands to keep the loaf intact. An example of a suitable inter-wrap machine 216 is the Model Carrera 2000 PC inter-wrap machine, available from Ilapak USA. At the discharge of the slicer 214, before the right angle transfer the loaf is run through two special rollers that give the loaf integrity to make the 90 degree roll about the longitudinal axis over onto the wrapper infeed conveyor 218.

The wrapper infeed conveyor 218 conveys the loaves longitudinally to the wrapper 216. The wrapper infeed conveyor 218 has a fixed pusher flight and a retractable keeper flight that opens up a specified distance to accept the tread as it transfers from the discharge of the slicer 214, then snaps back to hold the bread during conveyance.

The wrapper 216 has a specially designed forming head to reduce the possibility of the loaf from contacting any fixed metal or plastic machine component. The loaf conveying speed is matched to the film tracking speed. The loaf is sealed in a polypropylene wrapper to preserve freshness. The ends of the bag are sealed and gusseted.

After the interwrapping is complete the product is inspected for any remaining crust and is rejected if found. The wrapped loaves are transferred to a paddle type bread bagger 220 where each is inserted into a bread bag. An example of a suitable bagger 220 is the Model 2000 bagger, available from United Bakery Equipment. The bag passes through a tyer 222 where it is closed with a wire-type tie and then past an ink-jet printer 224 where the bag is date coded. A suitable tyer 222 from Burford Corporation. A suitable inkjet printer is available from Markem Corporation. The product is then conveyed on conveyor 226 to a packing area 228 where it is loaded into the proper delivery container (basket, tray or carton), for distribution.

Figure 5:
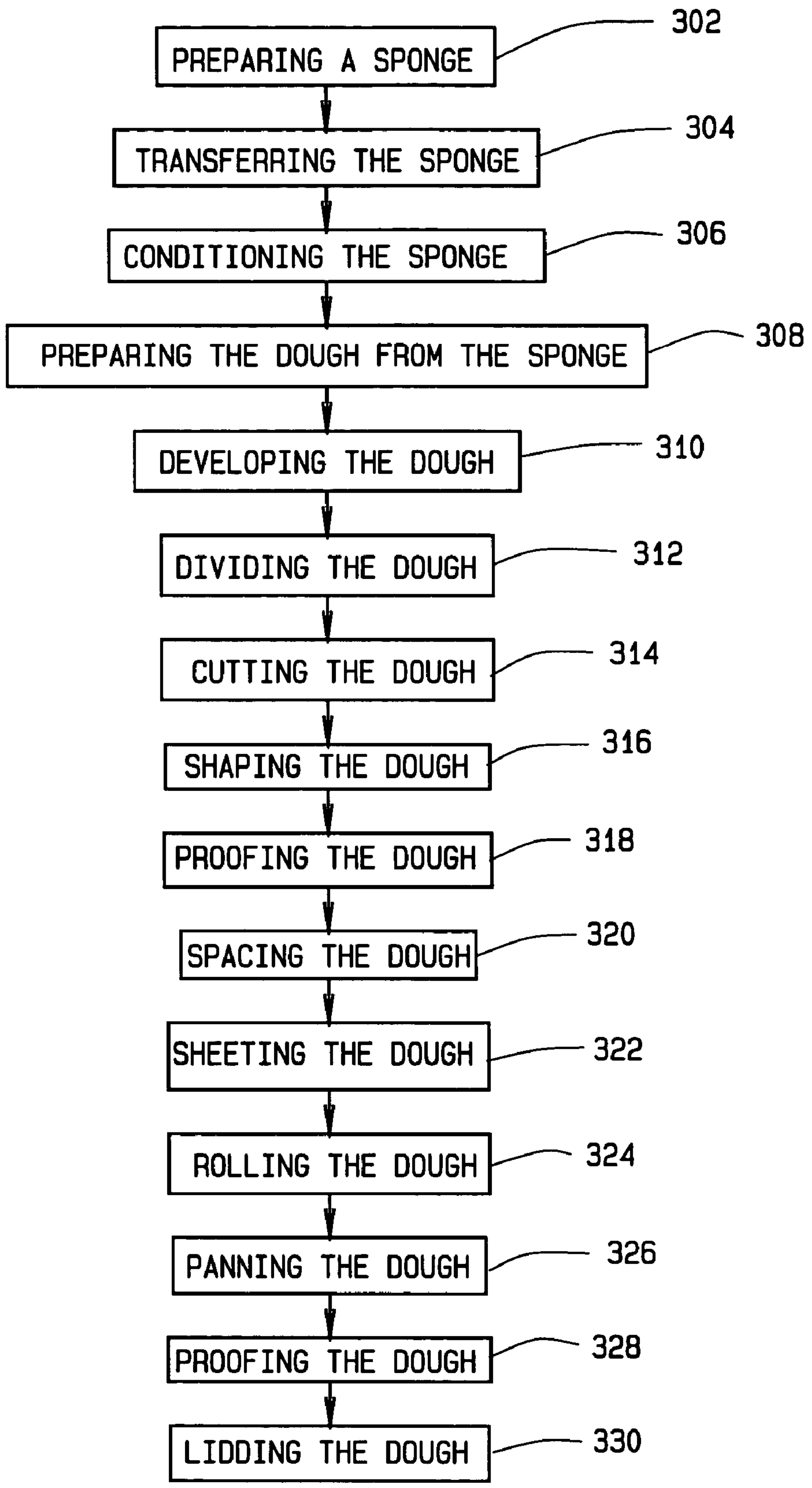
FIG. 5 is a flow chart of the step of making dough in accordance with the preferred embodiment of this invention.

The preferred embodiment of the method of making crustless, sliced bread of the present invention is illustrated in detail in FIGS. 5 through 10. As shown in FIG. 1, the first step of the method comprises making dough, which in the preferred embodiment as shown in FIG. 5, comprises at step 302 mixing a sponge, such as in tilt bowl mixer 100 into which the main ingredients of the sponge are added through a mechanized bulk addition system, and the minor ingredients are added by hand. At step 304, the sponge is dumped into a trough and moved to a special conditioning cabinet 102 for development. At step 306, the sponge dough is allowed to development in the conditioning cabinet. At step 308, the conditioned sponge is removed to a final mixer 104, and the remainder of the dough ingredients are added, with a bulk weigh system and by hand. At step 310, after the dough is dumped into a stainless steel trough and held for a specified time (typically about 5 to 15 minutes) for development before further processing. At step 312, the dough is dumped into the hopper of an extrusion bread divider 108 by a trough elevator 110 and extruded. At step 314, the extruded dough is cut into balls of a precise weight.

At step 316 the dough is shaped and floured in conical three-quarter rounder 114. At step 318 the shaped and floured dough balls are proofed in cup style intermediate proofer 118. At step 320 the dough balls are sorted with a double-eliminator device 120 that rejects any balls that may be sticking together or piled on top of one another. At step 320, the dough is spaced with spacing convey 122. At step 322, the dough balls are sheeted with dual roll sheeter 124. At step 324, the dough is rolled into a log, turned, and re-rolled in cross grain molding table 126. At step 326, the dough is loaded into baking pans. At step 328 the dough pans are proofed in proof box 132. At step 330, lids are placed on the pans.

Figure 6:
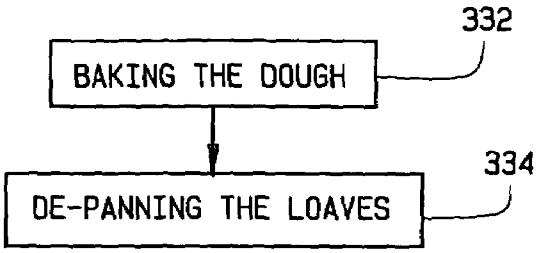
FIG. 6 is a flow chart of the step of baking dough in accordance with the preferred embodiment of this invention.

As shown in FIG. 1, the second step of the method is baking the bread, which in the preferred embodiment as shown in FIG. 6, comprises at step 332 the dough is baked into rectangular prismatic loaves in baking oven 140. At step 334, the bread is removed from the lidded pans with a device 150 that that removes the lids with a magnetized conveyor, and removes the bread from the baking pans by a vacuum device that gently lifts the bread from the pans.

Figure 7:
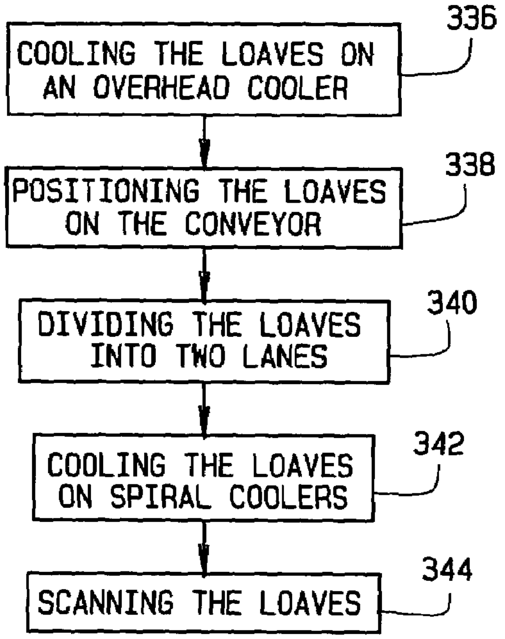
FIG. 7 is a flow chart of the step of cooling the loaves in accordance with the preferred embodiment of this invention.

As shown in FIG. 1, the third step of the method is cooling the bread, which in the preferred embodiment as shown in FIG. 7, comprises at step 336, cooling the loaves of bread on overhead cooling conveyor 164. At step 338, the loaves are positioned by organizing system 166. At step 340 the loaves are split into two lanes with horizontal slat 1-to-2 diverter 176. At step 342 the loaves pass successively through three tempered spiral coolers 178, 182, and 186. At step 344 the loaves are scanned for metal with metal detector 198.

Figure 8:
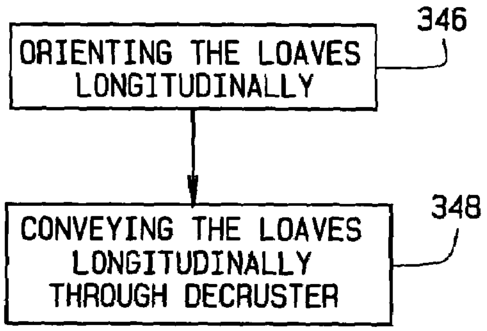
FIG. 8 is a flow chart of the step of decrusting the loaves in accordance with the preferred embodiment of this invention.

As shown in FIG. 1, the fourth step of the method is decrusting the loaves, which in the preferred embodiment as shown in FIG. 8, comprises at step 346, reorienting the loaves from a transverse to longitudinal direction, and at 348 the loaves fed longitudinally into a decruster 210.

Figure 9:
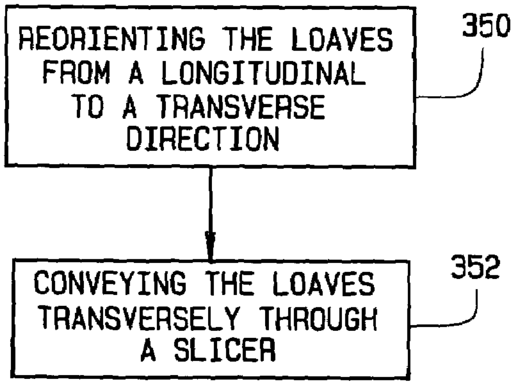
FIG. 9 is a flow chart of the step of slicing the loaves in accordance with the preferred embodiment of this invention.

As shown in FIG. 1, the fifth step of the method is slicing the loaves, which in the preferred embodiment as shown in FIG. 9, comprises at 350, reorienting the loaves of bread from a longitudinal to a transverse direction, and at 352, the loaves with the heals intact are conveyed transversely through a band slicer 214. At step 354, the heals of the loaves are split off.

Figure 10:
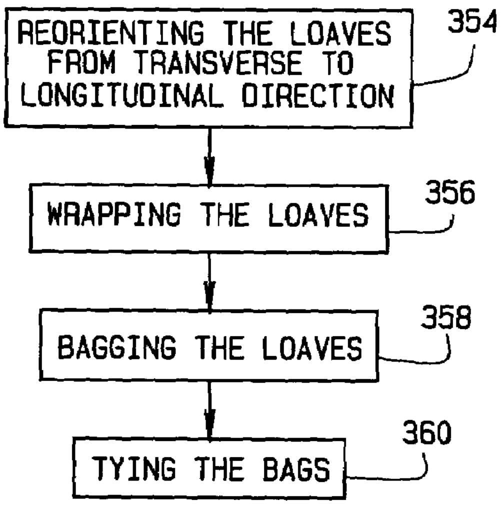
FIG. 10 is a flow chart of the step of packaging the loaves in accordance with the preferred embodiment of this invention.

As shown in FIG. 1, the sixth step of the method is packaging the loaves, which in the preferred embodiment as shown in FIG. 10, comprises at step 354, rotating the loaves about their longitudinal axis, and at 356 fed longitudinally to an inter-wrap machine 216. At step 358, the wrapped loaf are fed longitudinally to a bagger 220 where each is inserted into a bread bag. At step 360, the bag is tied at tyer 222.

What is claimed is:

1. A method of making a loaf of crustless, sliced bread from a rectangular prismatic loaf of bread, the method comprising:

decrusting the bread by moving the loaf of bread longitudinally past cutting blades to remove the crust from four sides of the loaf of bread;

slicing the crustless bread by moving the loaf transversely past a plurality of blades to slice the loaf; and packaging the loaf by moving the loaf longitudinally to a packaging station.

2. The method according to claim 1 wherein the step of slice the bread include removing the ends.

3. The method according to claim 1 wherein the step of packaging the sliced, crustless bread comprises rotating the sliced, crustless loaf about its longitudinal axis onto a conveyor for moving the sliced crustless, loaf longitudinally to the packaging station.

4. The method according to claim 1 wherein the loaf has a density of at least about 0.080 ounces per cubic inch.

5. The method according to claim 4 wherein the loaf has a density of between about 0.080 and about 0.095 ounces per cubic inch.

6. The method according to claim 1 wherein the loaf is cooled to a temperature of about 42° F. and dried to a moisture content of less than about 45% before decrusting and slicing.

7. The method according to claim 1 wherein the loaf has a moisture content of less than about 45% before decrusting and slicing.

8. The method according to claim 7 wherein the loaf has a moisture content of between about 43% and about 45% before decrusting and slicing.

9. The method according to claim 1 wherein the loaf is cooled to a temperature of about 42° F. or below before decrusting and slicing.

10. The method according to claim 9 wherein the loaf is cooled to a temperature of between about 35° F. and about 42° F. before decrusting and slicing.

11. The method according to claim 1 wherein the loaf is cooled to a temperature of about 42° F. or below and dried to a moisture content of less than about 45% before decrusting and slicing.

12. The method according to claim 1 further comprising cooling the loaf in at least two stages to a temperature of 42° F. or less before decrusting crusting or slicing.

13. The method according to claim 12 further comprising cooling the loaf in at least three stages to a temperature of 42° F. or less before decrusting crusting or slicing.

14. The method according to claim 13 wherein at least a portion of the first stage of cooling is done at ambient temperature, at least a portion of the second stage of cooling is done at a temperature of about 40° F. or less, and wherein at least a portion of the third stage of cooling is done at a temperature of less than about 32° F.

15. The method according to claim 13 wherein the loaf is cooled to a temperature of between about 95° F. and about 110° F. during a first stage of cooling; to a temperature of between about 80° F. and about 90° F. during a second stage of cooling, and to temperature of between about 35° F. and about 42° F. during a third stage of cooling.

16. The method according to claim 15 wherein the loaf is allowed to sit at ambient temperature for at least 45 minutes at ambient temperature after cooling, before decrusting and slicing.

17. The method according to claim 1 wherein the loaf weighs about 37.5 ounces before the crust is removed.

18. The method according to claim 1 wherein the crustless, sliced loaf weighs between about 16 ounces and about 18.5 ounces.

19. The method according to claim 1 wherein the step of moving the loaf longitudinally to a packaging station comprises rotating the loaf about its longitudinal axis onto a conveyor after slicing the loaf.

20. The method according to claim 1 further comprising the step of baking dough in a lidded pan to form a rectangular prismatic loaf.

21. The method according to claim 20 further comprising the step of conveying the loaf through at least two refrigerated chambers to reduce its temperature and moisture content.

22. The method according to claim 20 further comprising cooling the loaf at ambient temperature to a temperature of less than about 110° F., cooling the loaf at a temperature of about 40° F. or less to a temperature of than about 40° F. to a temperature of less than about 90° F., and cooling the loaf at a temperature of less than about 32° F. to a temperature of less than about 42° F. before decrusting and slicing.

23. The method according to claim 20 wherein the loaf has four sides, and wherein the decrusting step comprising moving the loaf longitudinally between first and second blades to simultaneously remove crust from opposite sides of the loaf, and moving the loaf past third and fourth blades to remove the crust from third and fourth sides.

24. The method according to claim 23 wherein the loaf is cooled to a temperature of about 42° F. and dried to a moisture content of less than about 45% before decrusting and slicing.

25. The method according to claim 23 wherein the loaf is cooled to a temperature of about 42° F. or below before decrusting and slicing.

26. The method according to claim 25 wherein the loaf is cooled to a temperature of between about 35° F. and about 42° F. before decrusting and slicing.

27. The method according to claim 23 wherein the loaf is cooled to a temperature of about 42° F. and dried to a moisture content of less than about 45% before decrusting and slicing.

28. The method according to claim 23 further comprising cooling the loaf in at least two stages to a temperature of 42° F. or less before decrusting crusting or slicing.

29. The method according to claim 28 further comprising cooling the loaf in at least three states to a temperature of 42° F. or less before decrusting crusting or slicing.

30. The method according to claim 29 wherein the loaf is cooled to a temperature of between about 95° F. and about 110° F. during a first stage of cooling; to a temperature of between about 80° F. and about 90° F. during a second stage of cooling, and to temperature of between about 35° F. and about 42° F. during a third stage of cooling.

31. The method according to claim 30 wherein the loaf is allowed to sit at ambient temperature for at least one hour at ambient temperature after cooling, before decrusting and slicing.

32. The method according to claim 23 wherein the loaf has a moisture content of less than about 45% before decrusting and slicing.

33. The method according to claim 32 wherein the loaf has a moisture content of between about 43% and about 45% before decrusting and slicing.

34. The method according to claim 20 wherein the loaf has a density of at least about 0.080 ounces per cubic inch.

35. The method according to claim 34 wherein the loaf has a density of between about 0.080 and about 0.095 ounces per cubic inch.

36. A method of making a loaf of crustless, sliced bread from a rectangular prismatic loaf of bread having four sides, the method comprising:

decrusting the bread by moving the loaf of bread longitudinally past cutting blades to remove the crust from four sides of the loaf of bread the decrusting step comprising moving the loaf longitudinally between first and second blades to simultaneously remove crust from opposite first and second sides of the loaf, and moving the loaf past third and fourth blades to remove crust from third and fourth sides;

slicing the crustless bread by moving the loaf transversely past a plurality of blades to slice the loaf; and packaging the loaf by moving the loaf longitudinally to a packaging station.

* * * * *